(No Model.)  3 Sheets—Sheet 1.

A. J. HATCH.
FRUIT DRIER.

No. 371,684.  Patented Oct. 18, 1887.

Witnesses,
Geo. H. Strong.

Inventor,
A. J. Hatch
Dewey & Co.
Att'y (No Model.) 3 Sheets—Sheet 2.

A. J. HATCH.
FRUIT DRIER.

No. 371,684. Patented Oct. 18, 1887.

Witnesses,
Geo. H. Strong.

Inventor,
A. J. Hatch
By Dewey & Co.
Atty.

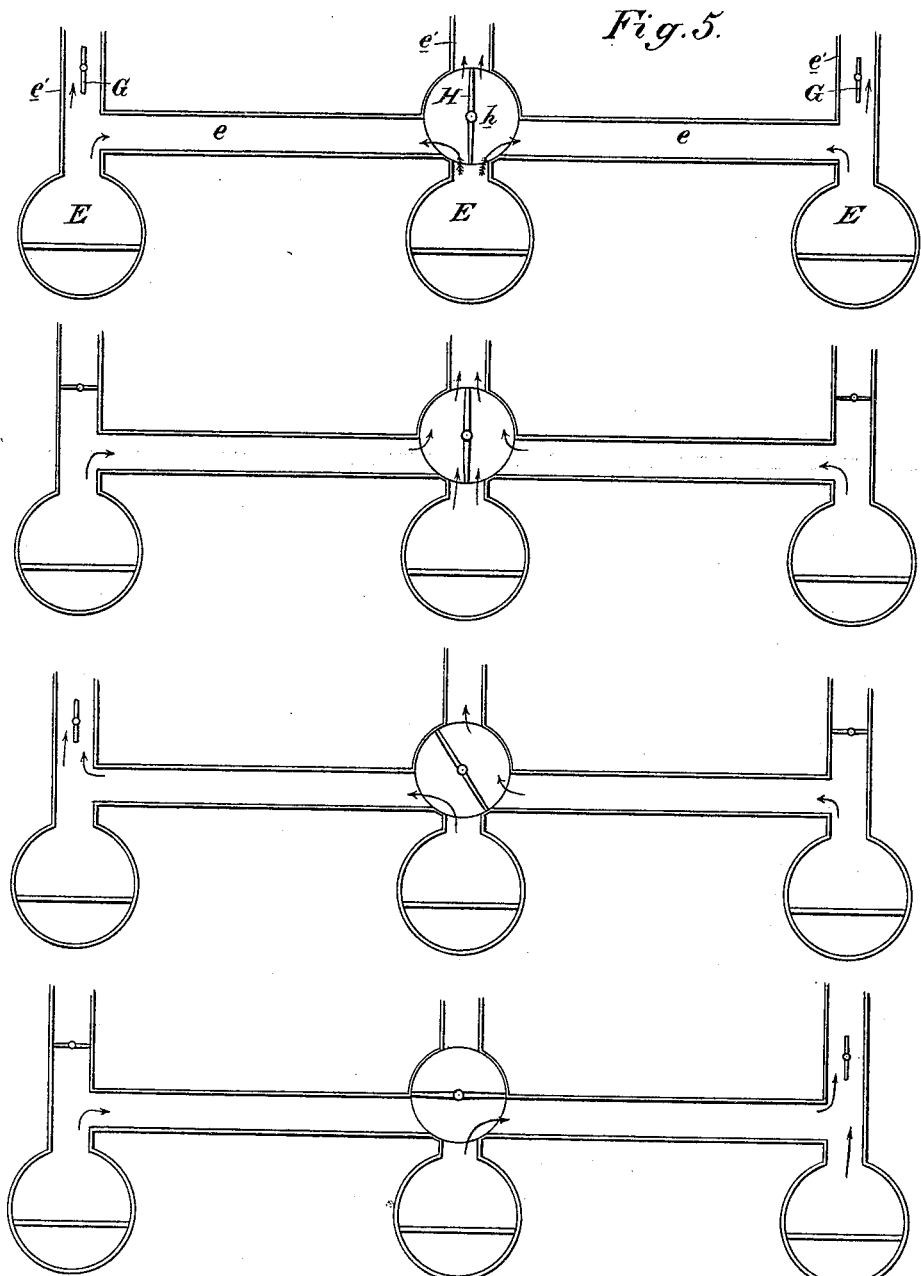

UNITED STATES PATENT OFFICE.

ANDREW J. HATCH, OF SAN FRANCISCO, CALIFORNIA.

FRUIT-DRIER.

SPECIFICATION forming part of Letters Patent No. 371,684, dated October 18, 1887.

Application filed June 7, 1886. Serial No. 204,413. (No model.)

*To all whom it may concern:*

Be it known that I, ANDREW J. HATCH, of the city and county of San Francisco, State of California, have invented an Improvement in Fruit-Driers; and I hereby declare the following to be a full, clear, and exact description of the same.

My invention relates to apparatus for drying fruits and other substances, and especially to that class of driers in which long horizontal chambers are employed, having doors or openings at the sides, through which cars loaded with trays containing the fruit or other substance are introduced to be dried, and removed when completed, and more especially to such driers as have the heating apparatus beneath the drying-chamber and in which the reversible draft is employed.

My invention consists in certain improvements in said drying apparatus; and these improvements consist in one or more furnaces or heating-drums placed within the lower or heating chamber and connected by flues with each other and with corresponding radiators in the drying-chamber above, said flues and radiators being provided with a system of dampers so arranged that the air-currents in the flues can be concentrated in one, two, or more radiators, or separated or cut off from either at will. The radiators are placed between the cars as they stand in the drying-chamber, and are intended to renew or restore the temperature of the air-current, which is otherwise rapidly reduced by contact with the fruit and constant absorption of moisture in its passage through the chamber. The radiators are therefore placed at such points in the chamber as are best calculated to secure such result.

The full objects and advantages of my improvements will be understood better after I have completed the description of the construction, which said description I will now proceed to make, with the assistance of the accompanying drawings, to which reference is hereby made.

Figure 1:
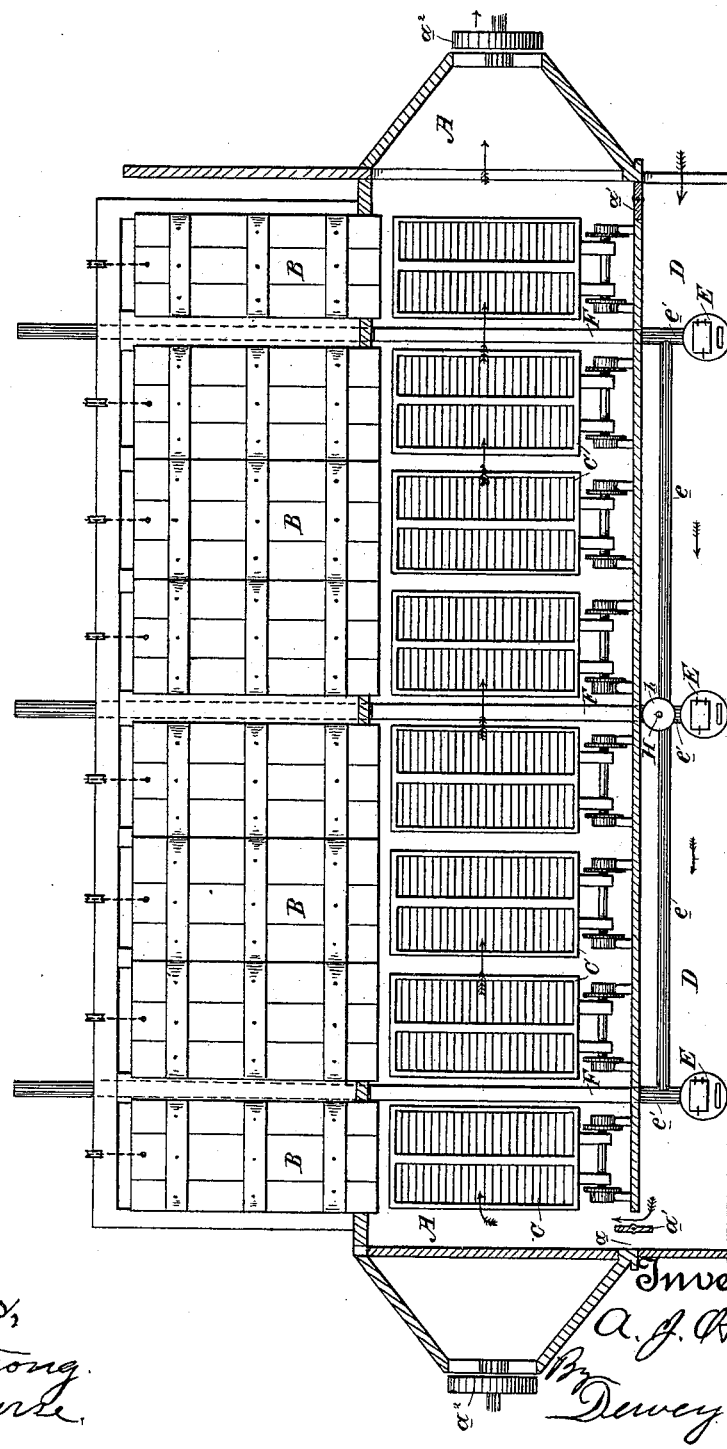
Figure 2:
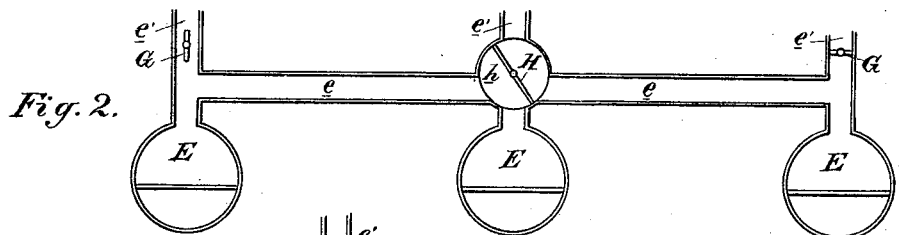
Figure 3:
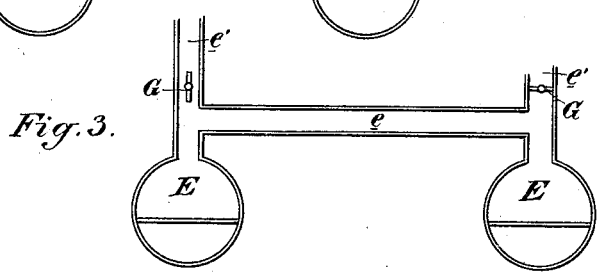
Figure 4:
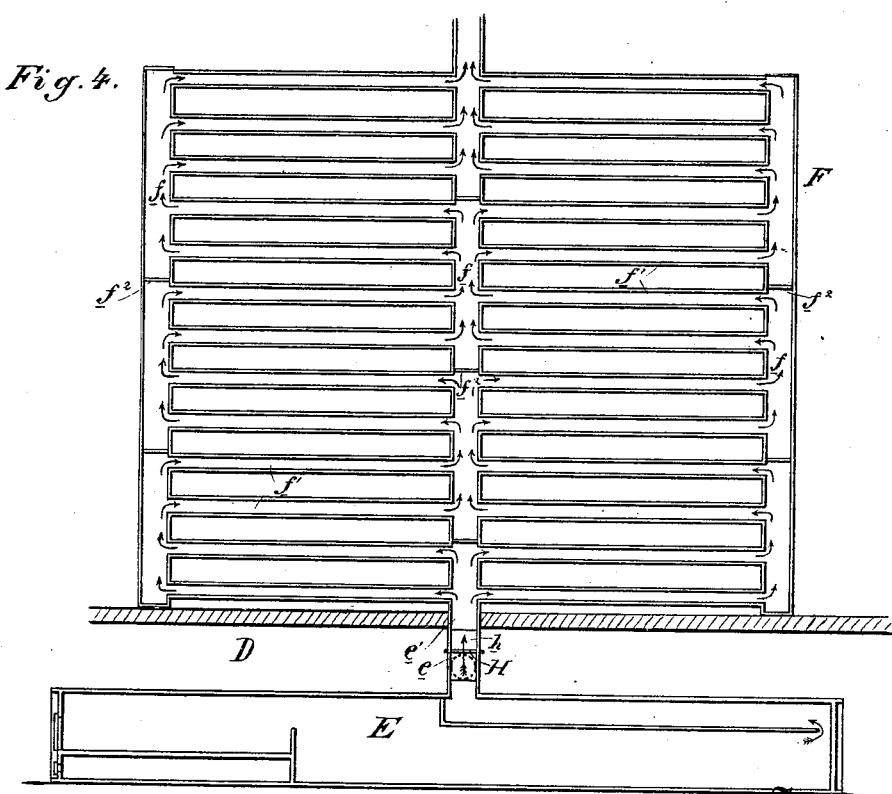

In the drawings, Figure 1 is a side elevation of my drier, the doors being raised in order to show the tray-laden cars in the drying-chamber and the radiators between the cars, and the side wall of the heating-chamber being omitted in order to show the furnaces or heating-cylinders or drums therein, their connecting-flues by which they communicate with each other and with the radiators in the drying-chamber, and the dampers in said flues. Fig. 2 is a section of a system of three furnaces, their connecting-flues, and the dampers in the flues for properly controlling them. Fig. 3 is similar view of a system of two furnaces and flues with their dampers. Fig. 4 is a vertical section of one of the furnaces, one of the radiators, the connection between the furnace and radiator, the controlling-damper, and the entrance of the communicating flue of an adjacent furnace. Fig. 5 is a diagram showing the controlling effect of the dampers.

A is the drying-chamber, access to which is had through the openings in its side, which are controlled by the doors B, here shown (Fig. 1) as raised. Within the drying-chamber are the cars C, which carry the trays of fruit or other substances to be dried. These cars travel upon suitable tracks, upon which they are readily moved into the drying-chamber, and again removed when the operation is completed. The cars are independent of each other and are separated, whereby a space is left between them. Under the drying-chamber is the heating-chamber D, which communicates with the drying-chamber through suitably-arranged apertures $a$, controlled by gates or valves $a'$, which, with the assistance of the suction-fans $a^2$ at each end, provide for a reversible draft through the drying-chamber.

Thus far the construction is similar to that I have previously shown in several patents, to one of which I shall presently make particular reference.

Within the heating-chamber D are the furnaces or heating-drums E. These consist, preferably, of cylinders which lie transversely of the chamber D and are provided with the necessary fire-box, grates, doors, ash-pit, &c., making them regular furnaces. There may be one, two, or more of these furnaces, as I shall explain. I have in Fig. 1 shown three, and from these I will explain the operation, leaving a modified operation to be described from a less number.

As I have shown three furnaces, I show also three corresponding radiators, F. These are located within the drying-chamber, and stand in the spaces between the tray-laden cars, as shown in Fig. 1. These radiators may be of any suitable construction, though they should not obstruct the main draft through the drying-chamber. They are therefore made of an open frame-work character, which will allow the draft to pass through them. The particular construction I prefer for these radiators is shown in Fig. 4. They consist of vertical pipes $f$ and intervening horizontal pipes, $f'$, which, for the purpose of presenting as little obstruction as possible to the main draft, are made flat. Within the vertical pipes are the dampers $f^2$, which are so arranged at different heights as to control and direct the heated gases, throwing them from the center sidewise and back again in their course to the outlet above, thus providing for a perfect distribution throughout the radiator.

The radiators having but little thickness are adapted to stand between the cars. They are of sufficient length to traverse the drying-chamber and of a height corresponding to the height of said chamber, so that from their surface the heat can be radiated throughout the cross-section of the said drying-chamber. Each radiator is connected directly, as at $e'$, with the furnace immediately below, and it will be seen that the radiators may be regarded practically as flues of the furnaces. The furnaces are also connected with each other by the flues $e$. In the connection $e'$ between each furnace and the corresponding radiator, and at a point above the flues $e$ by which the furnaces communicate with each other, is a damper, G. Where the three furnaces are employed, as shown in Figs. 1 and 2, there is a double damper, H, at the center furnace. This damper is seated in a suitable casing, drum, or chamber, $h$, at the point of junction of the flues $e$, connecting the center furnace with the furnaces upon each side and the pipe which connects said center furnace with its corresponding radiator. It will be seen by reference to Fig. 5 what effect the proper manipulation of these dampers may produce. In the first figure of the diagram the dampers are so arranged that the heat from each furnace proceeds directly therefrom to its corresponding radiator. Now, by closing the side dampers and leaving the middle or double damper open, as in the second figure of the diagram, the heat from all three furnaces is concentrated into the radiator of the center furnace. In the third figure of the diagram it will be seen that the heat from the right-hand furnace is carried to the center radiator while the heat from the center furnace and from the left-hand furnace is concentrated into the radiator of said left-hand furnace. In the fourth figure of said diagram the heat of the three furnaces is concentrated in the radiator of the right-hand furnace. It is thus apparent that by the proper manipulation of the dampers the heat may be separated or divided or may be concentrated at will, thus supplying it to all or any of the radiators within the drying-chamber. It should be borne in mind that this heat is independent of the hot-air current or draft which proceeds from the heating-chamber. This current, which may be described as the "main" current or draft, is the one ordinarily employed, and derives its heat from simply passing by the furnaces within the heating-chamber, being created and drawn into the drying-chamber by the suction-fans. This is the ordinary drying current or draft of the apparatus, and it will be seen that the heat emitted from the radiators is supplementary to the main heating air-current.

I will now describe particularly the objects and advantages of my improvement.

In a raisin-drier of fifty tons capacity I find, in practice, the diminution of heat in the air-current averages ten degrees to each twenty feet of space traversed, or one degree to each two feet; hence I find it necessary to provide means for renewing the heat at intervals of twenty feet. Ordinarily the volume of air in passing from the heating to the drying chamber is overheated, and the first fruit with which it comes in contact suffers in consequence. I find the remedy for this in dividing the heat between the furnaces in the heating-chamber and the radiators in the drying-chamber, or rather in allowing a large proportion of the heat to pass from the furnace to the radiator. The result is that the main air current enters the drying-chamber at a safe temperature, and the radiator fills the office of restoring heat to the air-current as fast as it depreciates, or nearly so.

In my patent, No. 335,351, dated February 2, 1886, and also in my present drawings, I show a construction by which I obtain what may be called a "reversible draft"—that is to say, I employ such an arrangement of communicating apertures, with their controlling valves or gates, between the drying-chamber and the heating-chamber as enables me, by a proper manipulation of said valves or gates, to admit the main air-current at one end of the drying-chamber and draw it through said chamber to the other end, and to reverse the direction of said current, causing it to enter the drying-chamber at that end at which it previously emerged and drawing it through the end at which it previously entered. This is for the purpose of more equally drying the fruit at each end of the chamber.

The adaptability of my present improvement to a drier in which the reversible draft is employed may be described thus: When the air-current in the heating-chamber moves from right to left, it takes the opposite direction in the drying-chamber, and the declining temperature is restored to the draft or current as it comes in contact with the radiators, which in this case I substitute for or use in connection with the hot-air distributers shown in the patent referred to above, but which I place at a greater distance from each end of the chamber, so that the incoming hot-air current may spend a part of its force before it needs to be renewed by additional heat from the radiators. These radiators must not be confounded with the hot-air distributers of my previous patent, for the latter actually passed heated air into the chamber, while the radiators simply raise the temperature of the air already therein and do not give off air, which of course, being furnace-flues, they could not do. In operating this system of furnaces or heaters, flues, and radiators, my object is to concentrate the heat in the radiators in that half of the chamber nearest the incoming draft, because after passing the middle of the chamber it is not desirable to re-enforce the heat, which would soon be discharged with the air-current at the exit end of the chamber. By manipulating the dampers in the flues I concentrate the heat in the radiators situated from the middle toward the incoming draft, while from the middle to the exit it is entirely cut off; but when the draft in the chamber is reversed the heat in the radiators is also reversed. An important feature of this arrangement is that the air-current is re-enforced with hot air without increasing its volume. As I have before stated, I may use any number of furnaces, corresponding radiators, and connecting-flues which I may deem desirable, their number depending to a great extent upon the size and character of the drier. Thus in a small drier, in which the main air-current passes but in one direction, I might use but a single furnace and its corresponding radiator, locating said radiator in that end of the drying-chamber nearest the incoming draft for the purpose I have described. In a drier somewhat larger I would use two furnaces connecting with each other and with corresponding radiators, as shown in Fig. 3, placing said radiators near each end of the drying-chamber, so that when using the reversible draft their operation in the manner I have previously described would be effective. In a large drier I may use the three furnaces and corresponding radiators, with their connecting-flues, which I have shown in Figs. 1 and 2.

Having thus described my invention, what I claim as new, and desire to secure by Letters Patent, is—

1. In the drying-chamber of a fruit-drier, the heat-radiators F, consisting of vertical pipes $f$, intervening spaced horizontal pipes $f'$, and the dampers $f^2$ in the radiators, whereby the heated gases passing through the pipes may be directed and controlled, substantially as herein described.

2. In a fruit-drier having a drying-chamber and an underlying heating-chamber, the furnaces or heaters in the latter chamber, in combination with the heat-radiators F in the former chamber and connected directly with the furnaces or heaters, said radiators consisting of vertical pipes $f$, intervening spaced horizontal pipes $f'$, and dampers $f^2$, whereby the heated gases passing through the pipes may be directed or controlled, substantially as herein described.

3. In the drying-chamber of a fruit-drier having a horizontal draft, radiating flues connected with furnaces or heaters located in a heating-chamber under the drying-chamber, said furnaces or heaters being also connected with each other by flues provided with adjustable dampers, which can be so regulated as to cause the draft in said flues to concentrate in one, two, or more of the radiating-flues in the drying-chamber, substantially as herein described.

4. In a fruit-drier having a drying-chamber and a heating-chamber communicating therewith, whereby a hot-air current or draft may be supplied to the heating-chamber, a furnace or furnaces within the heating-chamber and corresponding radiators within the drying-chamber, a connection, $e'$, between said radiators and the furnaces, flues connecting the furnaces with each other, and dampers by which the draft from the furnaces may be controlled in such a manner as to allow their heat to pass to their corresponding radiators, or to be concentrated in one or more of said radiators, substantially as herein described.

5. In the heating-chamber of a fruit-drier having a horizontal draft in both heating and drying chambers, one or more furnaces or heaters connected with each other and also connected with radiators in the drying-chamber above the heating chamber, the furnace-connections being provided with dampers, which may be so regulated as to concentrate or separate the air-current of said connections, and thereby regulate the temperature in the drying-chamber, substantially as herein described.

6. In a fruit-drier having the drying-chamber over the heating-chamber, said chambers communicating with each other through the valved apertures $a$, whereby a reversible draft in the drying-chamber may be obtained, the combination of heaters or furnaces in the heating-chamber, radiators within the drying-chamber and connected with the heaters or furnaces, flues connecting the heaters or furnaces with each other, and dampers which may be operated so as to cause the air-currents from the heaters or furnaces to concentrate in one, two, or more of the radiators, or be diverted from one part of the drying-chamber to another in order to adapt the locality of the radiating heat to the direction of the draft, substantially as herein described.

7. In a fruit-drier, the drying-chamber A, containing the separated tray-laden cars C, the heating-chamber D, under the drying-chamber, the valved apertures $a$, controlling the communication of the two chambers, and the suction-fans $a^2$ of the drying-chamber, whereby a reversible draft may be had through the drying-chamber, in combination with the heaters or furnaces E within the heating-chamber, the corresponding radiators F within the drying-chamber and located between the cars therein, the flue-connections between the heaters or furnaces and between each of said heaters or furnaces and its corresponding radiator, and the dampers G H in said flue-connections, all arranged and adapted to operate substantially as herein described.

In witness whereof I have hereunto set my hand.

ANDREW J. HATCH.

Witnesses:
LEE D. CRAIG,
S. H. NOURSE.